(12) United States Patent
Shen et al.

(10) Patent No.: US 10,392,553 B2
(45) Date of Patent: Aug. 27, 2019

(54) METHOD FOR ENHANCING PRODUCTIVITY OF HYDROCARBON FORMATIONS USING FLUID CONTAINING ORGANOMETALLIC CROSSLINKING AGENT AND SCALE INHIBITOR

(71) Applicant: Baker Hughes Incorporated, Houston, TX (US)

(72) Inventors: Dong Shen, The Woodlands, TX (US); Dora V. Galvan, Houston, TX (US); Hoang V. Le, Spring, TX (US); Qi Qu, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 352 days.

(21) Appl. No.: 14/015,660

(22) Filed: Aug. 30, 2013

(65) Prior Publication Data

US 2015/0060062 A1    Mar. 5, 2015

(51) Int. Cl.
| | |
|---|---|
| *E21B 43/16* | (2006.01) |
| *C09K 8/52* | (2006.01) |
| *C09K 8/528* | (2006.01) |
| *C09K 8/68* | (2006.01) |
| *C09K 8/88* | (2006.01) |
| *C09K 8/90* | (2006.01) |

(52) U.S. Cl.
CPC .............. *C09K 8/52* (2013.01); *C09K 8/528* (2013.01); *C09K 8/685* (2013.01); *C09K 8/882* (2013.01); *C09K 8/887* (2013.01); *C09K 8/90* (2013.01); *E21B 43/16* (2013.01)

(58) Field of Classification Search
CPC .......... E21B 43/26; C09K 8/52; C09K 8/528; C09K 8/62
See application file for complete search history.

(56) References Cited

U.S. PATENT DOCUMENTS

| | | |
|---|---|---|
| 3,301,723 A | 1/1967 | Chrisp |
| 3,888,312 A | 6/1975 | Tiner et al. |
| 4,460,751 A | 7/1984 | Hanlon et al. |
| 4,514,309 A | 4/1985 | Wadhwa |
| 4,770,796 A | 9/1988 | Jacobs |
| 4,780,223 A | 10/1988 | Baranet et al. |

(Continued)

FOREIGN PATENT DOCUMENTS

EP    0 200 062 A2    11/1986

OTHER PUBLICATIONS

Lu et al., "Carbonate cements in Miller field of the UK North Sea: a natural analog for mineral trapping in CO2 geological storage," Environmental Earth Science, 2011, 62:507-517.*

(Continued)

*Primary Examiner* — Andrew Sue-Ako
(74) *Attorney, Agent, or Firm* — John Wilson Jones; Jones Delflache LLP

(57) ABSTRACT

Scales are prevented or inhibited from forming in a well or in a formation penetrated by a well by pumping into the well a fluid comprising a hydratable polymer, a crosslinking agent, such as an organometallic crosslinking agent containing a polyvalent metal and a scale inhibitor selected from the group consisting of polyvinyl sulfonates, a polyacrylamidomethylpropane sulfonic acid, carboxymethyl inulin and sulfonated polyacrylates and mixtures thereof.

21 Claims, 3 Drawing Sheets

(56) References Cited

U.S. PATENT DOCUMENTS

| | | | |
|---|---|---|---|
| 5,092,404 A * | 3/1992 | Falk et al. | 166/279 |
| 5,201,370 A | 4/1993 | Tjon-Joe-Pin | |
| 5,247,995 A | 9/1993 | Tjon-Joe-Pin et al. | |
| 5,562,160 A | 10/1996 | Brannon et al. | |
| 6,110,875 A | 8/2000 | Tjon-Joe-Pin et al. | |
| 6,265,355 B1 | 7/2001 | Lai et al. | |
| 6,844,296 B2 | 1/2005 | Dawson et al. | |
| 7,207,386 B2 | 4/2007 | Brannon et al. | |
| 7,303,018 B2 | 12/2007 | Cawiezel et al. | |
| 7,306,035 B2 * | 12/2007 | Collins et al. | 166/263 |
| 7,306,039 B2 | 12/2007 | Wang et al. | |
| 7,398,824 B1 | 7/2008 | Wang et al. | |
| 7,475,730 B2 | 1/2009 | Brown et al. | |
| 7,481,273 B2 | 1/2009 | Javora et al. | |
| 7,491,682 B2 | 2/2009 | Gupta et al. | |
| 7,493,955 B2 | 2/2009 | Gupta et al. | |
| 7,713,917 B2 | 5/2010 | Wang et al. | |
| 7,913,762 B2 | 3/2011 | Wheeler et al. | |
| 7,977,283 B2 | 7/2011 | Gupta et al. | |
| 8,022,015 B2 | 9/2011 | Carman et al. | |
| 8,418,762 B2 | 4/2013 | Casey et al. | |
| 8,517,095 B2 | 8/2013 | Armstrong et al. | |
| 8,664,168 B2 | 3/2014 | Steiner | |
| 9,010,430 B2 | 4/2015 | Darby et al. | |
| 9,102,860 B2 | 8/2015 | Cawiezel et al. | |
| 2004/0152602 A1 | 8/2004 | Boles et al. | |
| 2004/0177957 A1 | 9/2004 | Kalfayan et al. | |
| 2006/0046938 A1 | 3/2006 | Harris et al. | |
| 2006/0065396 A1 * | 3/2006 | Dawson et al. | 166/279 |
| 2006/0073980 A1 | 4/2006 | Brannon et al. | |
| 2007/0039732 A1 | 2/2007 | Dawson et al. | |
| 2008/0039347 A1 * | 2/2008 | Welton et al. | 507/213 |
| 2008/0128131 A1 * | 6/2008 | Nguyen | E21B 43/267 166/280.2 |
| 2009/0038799 A1 | 2/2009 | Garcia-Lopez de Victoria et al. | |
| 2009/0075844 A1 * | 3/2009 | Ke et al. | 507/90 |
| 2009/0093382 A1 | 4/2009 | Brannon et al. | |
| 2011/0067875 A1 | 3/2011 | Funkhouser et al. | |
| 2013/0157905 A1 | 6/2013 | Saini et al. | |
| 2014/0014338 A1 | 1/2014 | Crews et al. | |
| 2014/0076562 A1 | 3/2014 | Bhaduri et al. | |
| 2014/0299318 A1 | 10/2014 | Crews et al. | |
| 2015/0075792 A1 | 3/2015 | Brandi et al. | |

OTHER PUBLICATIONS

Powell et al., "Controlled-Release Scale Inhibitor for Use in Fracturing Treatments," SPE 28999, Society of Petroleum Engineers, 1995, pp. 571-579.*

D.V. Satya Gupta, Mike Brown, Steve Szymczak; "A 5-Year Survey of Applications and Results of Placing Solid Chemical Inhibitors in the Formation via Hydraulic Fracturing"; SPE 134414; Sep. 19-22, 2010; Florence, Italy.

Leonardo Maschio, Bilu Cherian, Bernhard Lungwitz, Michael Tyndall, Marieliz Garcia, Schlumberger, John Longwell; "Optimization of a Scale Treatment in the Uinta Basin—A Case History"; SPE 107993; Apr. 16-18, 2007; Denver, Colorado.

R.J. Powell, R. D. Gdanski, M.A. McCabe; "Controlled-Release Scale Inhibitor for Use in Fracturing Treatments"; SPE 28999; Feb. 14-17, 1995; San Antonio, Texas.

Aine Maeve Fitgerald et al; "A History of Frac-Pack Scale-Inhibitor Deployment"; SPE International Symposium and Exhibition on Formation Damage Control; SPE 112474; Jan. 1, 2008; pp. 13-15.

* cited by examiner

METHOD FOR ENHANCING PRODUCTIVITY OF HYDROCARBON FORMATIONS USING FLUID CONTAINING ORGANOMETALLIC CROSSLINKING AGENT AND SCALE INHIBITOR

FIELD OF THE DISCLOSURE

The disclosure relates to a method of enhancing the productivity of a hydrocarbon-bearing formation with a metal crosslinked fluid having a scale inhibitor of a polyvinyl sulfonate, a polyacrylamidomethylpropane sulfonic acid (AMPS), such as acrylamide-2-methylpropane sulfonic acid, carboxymethyl inulin or sulfonated polyacrylate in order to inhibit or prevent the formation of scales.

BACKGROUND OF THE DISCLOSURE

The formation of scales is a common problem in oil and gas wells. These mineral precipitations are known to form near the wellbore, along the casing and tubing, along pipes and heating coils, and inside pumps and valves. The formation of scales can decrease permeability of the subterranean formation penetrated by the well, reduce well productivity and shorten the lifetime of production equipment. In order to clean scales from wells and equipment it is often necessary to stop the production which is both time-consuming and costly.

Several methods are known in the art for introducing scale inhibitors into production wells. For instance, a liquid scale inhibitor may be included in a fracturing fluid and the fracturing fluid pumped into the formation from the surface. This forces the inhibitor into the targeted zone. Alternatively, liquid or solid scale inhibitors may be included in fracturing fluids as a means to transport the production chemicals into the formation to enhance performance.

Fracturing fluids typically contain a crosslinkable viscosifying polymer and a crosslinking agent. Commonly used viscosifying polymers include underivatized guar, guar derivatives and cellulosic derivatives. Commonly used crosslinking agents are those capable of providing borate ions as well as those agents which contain a metal ion such as aluminum, zirconium, titanium and antimony. Such viscosified fluids form three-dimensional gels.

Conventional scale inhibitors, such as phosphonate or polycarboxylates, are typically only feasible in borate crosslinked fracturing fluids. When used with organometallic crosslinking agents, traditional scale inhibitors cause gel stability problems and render gels with undesirable viscosities. This may be attributable to competition between the scale inhibitors and the water soluble viscosifying polymers for the metal crosslinking agents, producing inefficient complexing and thus poor viscosity enhancement.

Alternative scale inhibitors have been sought which may be used in fracturing fluids containing organometallic crosslinking agents.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved scale inhibitors useful in well treatment fluids containing a viscosifying polymer and an organometallic crosslinking agent having one or more of the attributes or capabilities described or shown in, or as may be apparent from, the other portions of this patent.

SUMMARY OF THE DISCLOSURE

An embodiment of the disclosure relates to a method for enhancing the productivity of a hydrocarbon-bearing calcareous or siliceous formation by introducing into a well penetrating the formation a well treatment composition having a crosslinkable viscosifying polymer; an organometallic crosslinking agent containing a metal selected from the group consisting of Zr, Ti, Al and Sb; and a scale inhibitor selected from the group consisting of polyvinyl sulfonates, polyacrylamidomethylpropane sulfonic acid, carboxymethyl inulin and sulfonated polyacrylates. Scales are prevented or inhibited from forming in the well and/or formation.

In another embodiment, a method of inhibiting or controlling the deposition of scales in a well or in a subterranean formation penetrated by a well is provided by pumping a well treatment fluid into the well having a crosslinkable viscosifying polymer; an organometallic crosslinking agent containing a Zr, Ti, Al or Sb metal; and a scale inhibitor selected from the group consisting of polyvinyl sulfonates having a number average molecular weight from about 500 to about 100,000, a polyacrylamidomethylpropane sulfonic acid having a number average molecular weight from about 500 to about 20,000, a carboxymethyl inulin having a number average molecular weight from about 500 to about 30,000 and sulfonated polyacrylates having a number average molecular weight from about 500 to about 30,000.

In another embodiment, a method of inhibiting or controlling the deposition of scales in a well or in a subterranean formation penetrated by a well is provided wherein a well treatment fluid is pumped into the well; the well treatment fluid having a crosslinkable viscosifying polymer selected from the group consisting of underivatized guar, guar derivatives, cellulose derivatives or a polyacrylamide and a zirconium or titanium crosslinking agent and a scale inhibitor containing a polyvinyl sulfonate, the pH of the well treatment fluid being between from about 3.0 to about 12.0.

In another embodiment, a method of inhibiting or controlling the deposition of scales in a well or in a subterranean formation penetrated by a well is provided wherein a well treatment fluid is pumped into the well; the well treatment fluid having a crosslinkable viscosifying polymer selected from the group consisting of underivatized guar, guar derivatives, cellulose derivatives or a polyacrylamide and a zirconium or titanium crosslinking agent and a scale inhibitor containing a carboxymethyl inulin when the pH of the well treatment fluid is between from about 8.0 to about 12.

In another embodiment, a method of inhibiting or controlling the deposition of scales in a well or in a subterranean formation penetrated by a well is provided wherein a well treatment fluid is pumped into the well; the well treatment fluid having a crosslinkable viscosifying polymer selected from the group consisting of underivatized guar, guar derivatives, cellulose derivatives or a polyacrylamide and a zirconium or titanium crosslinking agent and a scale inhibitor containing a sulfonated polyacrylate, the pH of the well treatment fluid being between from about 8.0 to about 12.0.

In another embodiment, a method for enhancing the productivity of a hydrocarbon-bearing calcareous or siliceous formation penetrated by a well is disclosed wherein a well treatment fluid comprising a crosslinkable viscosifying polymer, an inorganic crosslinking agent; and a scale inhibitor selected from the group consisting of polyvinyl sulfonates, a polyacrylamidomethylpropane sulfonic acid, carboxymethyl inulin and sulfonated polyacrylates and mixtures thereof is pumped into the well. Scales are inhibited or prevented from forming in the well and/or formation.

Accordingly, the present disclosure includes features and advantages which are believed to enable it to inhibit or prevent the formation of scales in a wellbore or in a formation penetrated by a wellbore. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
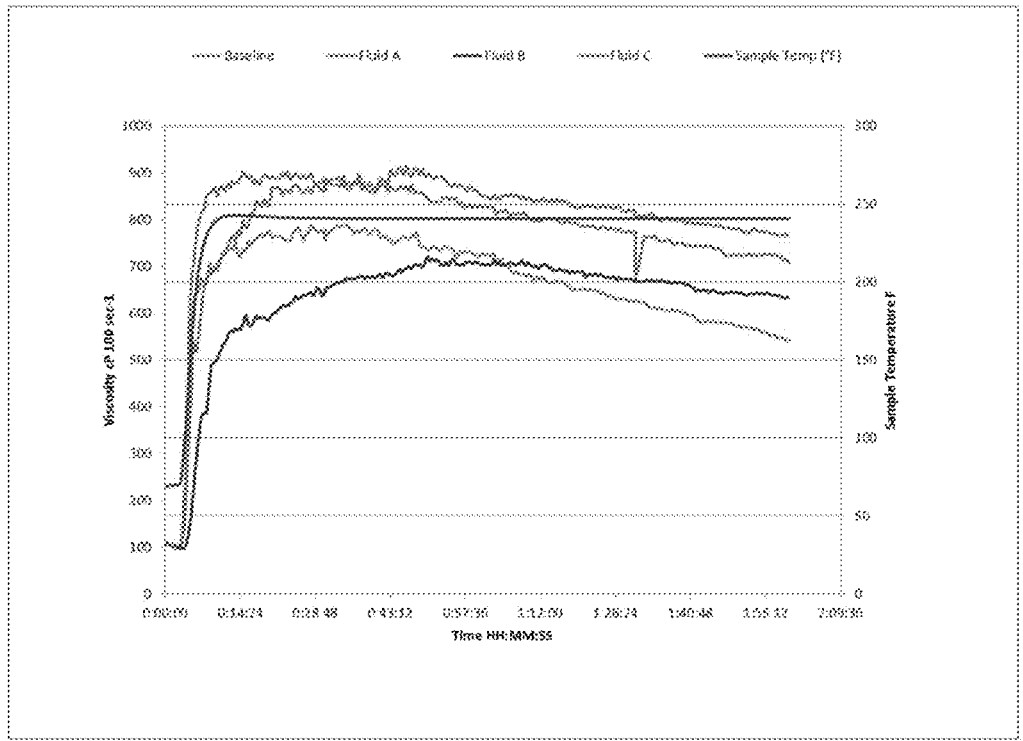
FIG. 1 compares fluid rheology between three separate fluids having high pH and containing carboxymethylhydroxypropyl guar and a zirconium crosslinker and polyvinyl sulfonate, sulfonated polyacrylate and carboxymethyl inulin as scale inhibitor.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims to refer to particular components. As one skilled in the art will appreciate, different persons may refer to a component by different names. This document does not intend to distinguish between components or materials that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The well treatment fluids defined herein include a hydratable viscosifying polymer, a crosslinking agent and a scale inhibitor. The scale inhibitor may be a polyvinyl sulfonate, carboxymethyl inulin or a sulfonated polyacrylate. The crosslinking agent may be an inorganic or an organometallic crosslinking agent. The crosslinking agent preferably contains a metal selected from the group consisting of titanium, zirconium, aluminum or antimony.

Unlike traditional scale inhibitors, the scale inhibitors described herein may be used in well treatment fluids containing a viscosifying polymer and a crosslinking agent without affecting the stability of the gelled fluid.

The scale inhibitors used in the well treatment fluids described herein are of relative low molecular weight. Generally, the number average molecular weight of the scale inhibitors described herein is generally not in excess of 125,000. The pH of the well treatment fluid is typically between from about 3 to about 12.

The well treatment fluid may be prepared on location or may be shipped to the desired location.

The polyvinyl sulfonates useful as scale inhibitors in this disclosure typically have a number average molecular weight between from about 500 to about 100,000. The polyvinyl sulfonates may be derived from a non-substituted unsaturated monomer of the formula $CH_2=CH(SO_3M)$ where M is a divalent metal such as calcium, magnesium, barium or strontium. Typically, the pH of the well treatment fluid containing a polyvinyl sulfonate as scale inhibitor is between from about 3 to about 12 and is preferably between from about 3.0 to about 6.0.

Polyacrylamidomethylpropane sulfonic acids (AMPS), such as acrylamide-2-methylpropane sulfonic acid, useful as scale inhibitors in this disclosure typically have a number average molecular weight between from about 500 to about 200,000. This polymer may be derived from a non-substituted unsaturated monomer of acrylamide-2-methylpropane sulfonic acid. Typically, the pH of the well treatment fluid containing a polyacrylamidomethylpropane sulfonic acid as scale inhibitor is between from about 3 to about 12 and is preferably between from about 3.0 to about 6.0.

The carboxymethyl inulin for use as a scale inhibitor as described herein typically has a number average molecular weight between from about 500 to about 30,000. A particularly preferred carboxymethyl inulin is the sodium salt of carboxymethyl inulin, especially those having an average degree of substitution (DS) (average amount of carboxymethyl groups/monosaccharide units) ranging from about 1.2 to about 2.7. Typically, the pH of the well treatment fluid containing a carboxymethyl inulin as scale inhibitor is between from about 8 to about 12, typically between from about 9.8 to about 11.2.

Sulfonated polyacrylates for use as the scale inhibitor in the present disclosure typically have a number average molecular weight between from about 500 to about 30,000. In a preferred embodiment, the sulfonated polyacrylate is a copolymer of acrylic acid or salt (such as an alkali metal, like sodium, or ammonium salt) and an unsubstituted vinyl sulfonate or acrylamide-2-methylpropane sulfonic acid (AMPS). Typically from 30 to 99 weight percent of the sulfonated polyacrylate contains vinyl sulfonate or AMPS units. Typically, the pH of the well treatment fluid containing a sulfonated polyacrylate as scale inhibitor is between from about 8 to about 12, typically between from about 9.8 to about 11.2.

The crosslinking agent for use with the above-described scale inhibitors are preferably heat or time activated. The crosslinking agent may optionally be encapsulated.

The crosslinking agent provides viscosity to the combination fluid by forming crosslinks with the viscosifying polymer. The viscosity of well treatment fluids containing the scale inhibitors described herein is acceptable for the fluids to be used in hydraulic fracturing operations. For example, the well treatment fluids when gelled by interaction of the viscosifying polymer and organometallic crosslinking agent may exhibit a viscosity in excess of 500 cP at 100 $sec^{-1}$ at temperatures in excess of 150° F. and even as high as 900 cP at 100 $sec^{-1}$ at temperatures in excess of 250° F. In an embodiment, the viscosity of the fluid after interaction of the hydratable viscosifying polymer and crosslinking agent forms a gel at temperatures in excess of 250° F. at 100 $sec^{-1}$ is from about 800 to 900 cP and in some cases in excess of 900 cP.

The crosslinking agent may be an organometallic compound or an inorganic compound. Typically, the crosslinking agent contains a salt which contains a trivalent or higher polyvalent metal ion. Examples of the trivalent or higher polyvalent metal ions include titanium, zirconium, chromium, aluminum, antimony, yttrium, cerium, iron, copper, zinc, etc. or a mixture thereof. In a preferred embodiment, the polyvalent metal of the crosslinking agent is titanium, zirconium, aluminum and antimony.

Examples of suitable crosslinkers may also be found in U.S. Pat. Nos. 4,514,309; 5,201,370; 5,514,309, 5,247,995, 5,562,160, and 6,110,875, incorporated herein by reference.

The more preferred crosslinking agents are organometallic (including organic complexed metal) compounds which can supply titanium or zirconium in a +4 oxidation valence state. These include organometallic compounds containing one or more alkanolamine ligands such as ethanolamine (mono-, di- or triethanolamine) ligands, such as bis(triethanolamine)bis(isopropyl)-titanium (IV). Zr (IV) and Ti (IV) may further be added directly as ions or oxy ions into the composition. Further, the compounds may be inorganic compounds like inorganic oxides, such as zirconium or titanium dioxide, inorganic chlorides, such as zirconium chloride or titanium chloride, zirconium oxynitrate, zirconium sulfate, titanium oxynitrate or titanium sulfate.

Exemplary zirconium IV containing compounds further include zirconium lactate, zirconium lactate triethanolamine, zirconium carbonate, zirconium ammonium carbonate, tetrabutoxyzirconium, zirconium monoacetyl acetonate, zirconium normal butyrate, zirconium normal propylate, zirconium glycolate, zirconium oxyacetate, zirconium acetate, zirconium acetylacetonate and zirconium diisopropylamine lactate. Exemplary titanium IV containing compounds titanium ammonium lactate, titanium triethanolamine, titanium acetylacetonate, titanium diisopropoxide bisacetyl aminate, titanium tetra-2-ethyl hexoxide, titanium tetraisopropoxide, titanium di-n-butoxy bistriethanol aminate, titanium isopropoxyoctylene glycolate, titanium diisopropoxybistriethanol aminate and titanium chloride.

Such organometallic and organic complexed metal crosslinking agents containing titanium or zirconium in a +4 valence state include those disclosed in British Pat. No. 2,108,122, herein incorporated herein by reference, which are prepared by reacting zirconium tetraalkoxides with alkanolamines under essentially anhydrous conditions.

Other zirconium and titanium crosslinking agents are described, for example, in U.S. Pat. Nos. 3,888,312; 3,301, 723; 4,460,751; 4,477,360; European Pat. No. 92,755; and U.S. Pat. No. 4,780,223, all of which are herein incorporated by reference.

Other organometallic compounds which may be used as the crosslinking agent in the fluids described herein are those capable of providing Zn (II), calcium, magnesium, aluminum, Fe (II), and Fe (III) to the composition. These may be applied directly to the composition as ions or as polyvalent metallic compounds such as hydroxides and chlorides from which the ions may be released.

The aqueous fluid contains at least one crosslinkable polymer. In an embodiment, suitable hydratable polymers are those which contain one or more functional groups, such as a hydroxyl, carboxyl, sulfate, sulfonate, amino or amido group.

The crosslinkable polymer is preferably a hydratable polysaccharide derivative, such as a cellulosic derivative, starch, galactomannan gums such as guar and guar derivatives, xanthan and carrageenan.

Suitable cellulosic derivatives include alkyl celluloses, hydroxyalkyl celluloses like hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose and ethylhydroxyethyl cellulose; alkylhydroxyalkyl celluloses like methylhydroxyethyl cellulose, ethylhydroxyethyl cellulose and methylhydroxypropyl cellulose as well as carboxyalkyl cellulose derivatives like carboxyethylcellulose and carboxymethylcellulose; carboxymethylhydroxyethyl cellulose and alkylcarboxyhydroxy celluloses including carboxymethyl hydroxyethyl cellulose and carboxymethyl hydroxypropyl cellulose.

Specific guar gum derivatives include carboxyalkyl guars and hydroxyalkylated guars. Especially preferred are carboxymethyl guar, hydroxypropyl guar, hydroxyethyl guar, hydroxybutyl guar and carboxymethylhydroxypropyl guar.

In an embodiment, the hydroxyalkylated guar may have a molecular weight of about 1 to about 3 million. The carboxyl content of the hydratable polysaccharides is expressed as Degree of Substitution ("DS") and ranges from about 0.08 to about 0.18 and the hydroxypropyl content is expressed as Molar Substitution (MS) (defined as the number of moles of hydroxyalkyl groups per mole of anhydroglucose) and ranges between from about 0.2 to about 0.6.

Other suitable polysaccharides and derivatives are those which contain one or more monosaccharide units of galactose, fructose, mannose, glucoside, glucose, xylose, arabinose, glucuronic acid and pyranosyl sulfate as well as locust bean gum, tara, xanthan including unmodified xanthan gum, non-acetylated xanthan gum, non-pyruvylated xanthan gum and non-acetylated-non-pyruvylated xanthan gum, succinoglycan, scleroglucan, carrageenan, gum Arabic, tara gum, gum ghatti, karaya, tragacanth, pectin, starch, locust bean gum, tamarind and derivatives thereof.

In addition to polysaccharides, synthetic polymers may be used as the viscosifying polymer. Such synthetic polymers include polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Suitable viscosifying polymers are polyacrylamide and alkylpolyacrylamides, copolymers of polyacrylamide and alkylpolyacrylamides (such as copolymers with ethylene, propylene and/or styrene), polymaleic anhydride, polyacrylate and polymethacrylate and mixtures thereof and salts thereof. For instance, the viscosifying polymer may be a copolymer of sodium acrylate and acrylamide. Such viscosifying polymers include those having a weight average molecular weight between from about 0.1 MMDa to about 30 MMDa, preferably between from about 0.25 MMDa to about 10 MMDa.

In a preferred embodiment, the viscosifying polymer is partially hydrolyzed polyacrylamide (PHPA). As such, the partially hydrolyzed polyacrylamide (PHPA) is an acrylamide containing polymer having at least 1%, but not 100%, of the acrylamide groups in the form of carboxylate groups.

Further suitable viscosifying polymers include copolymers containing acrylamide and at least one of an acrylate and an acrylamidomethylpropane sulfonic acid (AMPS). Such viscosifying polymers include those copolymers are of the formula:

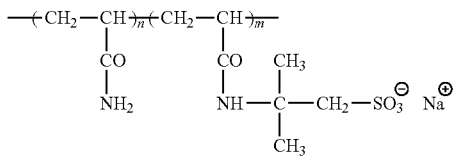

wherein m is 2 to 5 and n is 4 to 8. Exemplary of such viscosifying polymers are containing from about 20 to 50% acrylamidomethylpropane sulfonic acid (AMPS), about 2 to 5% acrylic acid, and about 45 to 78% acrylamide. More preferably, the polymer comprises about 35 to 50% AMPS.

Typically, the amount of viscosifying polymer employed is between from about 15 to about 160, preferably from about 20 to about 50, pounds per 1,000 gallons of water in the fluid.

In addition to a crosslinking agent, the well treatment fluid may further contain conventional additives such as a crosslinking delaying agent. The amount of crosslinking delaying agent in the well treatment fluid will vary based on design. Suitable crosslinking or viscosification delaying agents may include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof. Preferred crosslinking delaying agents include various organic or inorganic acids, sorbitol as well as mixtures thereof. Such crosslinking delaying agents, when used, are typically desirous to delay or inhibit the effects of the crosslinking agent and thereby allow for an acceptable pump time of the well treatment composition at lower viscosities. Thus, the crosslinking delaying agent inhibits crosslinking of the polysaccharide until after the well treatment composition is placed at or near desired location in the wellbore.

Along with crosslinking delaying agents, the well treatment fluid may further contain a complexing agent, gel breaker, surfactant, biocide, surface tension reducing agent, scale inhibitor, gas hydrate inhibitor, polymer specific enzyme breaker, oxidative breaker, buffer, clay stabilizer, acid or a mixture thereof and other well treatment additives known in the art.

The well treatment fluid may be prepared on location using a high shear foam generator or may be shipped to the desired location.

Where the well treatment fluid is used as a fracturing fluid, the well treatment fluid may further contain a proppant. Suitable proppants include those conventionally known in the art including quartz sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc.

Further the proppant may include porous ceramics or organic polymeric particulates. The porous particulate material may be treated with a non-porous penetrating material, coating layer or glazing layer. For instance, the porous particulate material may be a treated particulate material, as defined in U.S. Patent Publication No. 20050028979 wherein (a) the ASG of the treated porous material is less than the ASG of the porous particulate material; (b) the permeability of the treated material is less than the permeability of the porous particulate material; or (c) the porosity of the treated material is less than the porosity of the porous particulate material.

When used in hydraulic fracturing, the well treatment fluid may be injected into a subterranean formation in conjunction with other treatments at pressures sufficiently high enough to cause the formation or enlargement of fractures or to otherwise expose the proppant material to formation closure stress. Such other treatments may be near wellbore in nature (affecting near wellbore regions) and may be directed toward improving wellbore productivity and/or controlling the production of fracture proppant.

The well treatment fluid, in addition to preventing or inhibiting the formation of scales in the formation, also prevents or inhibits the formation of scales on tubing, casing, pipes, pumps and valves which are located within the well.

Preferred embodiments of the present disclosure thus offer advantages over the prior art and are well adapted to carry out one or more of the objects of this disclosure. However, the present disclosure does not require each of the components and acts described above and is in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Three fracturing fluids—A, B and C—were prepared by adding 1.5 ml of a buffering agent, commercially available from Baker Hughes Incorporated as BF-7L, to 10 ml carboxymethylhydroxypropyl guar polymer slurry in 1000 ml tap water to bring the pH of the solution to 10.2. A scale inhibitor was added to each of the fluids. Fluid A contained 2 gallons per thousand (gpt) of polyvinyl sulfonate, Fluid B contained 1 gpt of sulfonated polyacrylate and Fluid C contained 1 gpt of carboxymethyl inulin. 1.25 ml of a zirconium crosslinker, commercially available as XLW-60 from Baker Hughes Incorporated, was added to each of the fluids. Viscous gels instantly resulted requiring high shear to assure homogeneity. The viscosity was measured with a Fann 50 viscometer at 240° F. The fluids were initially sheared at 100 sec$^{-1}$, followed by a shear rate sweeps of 100, 80, 60 and 40 sec$^{-1}$ to calculate the power law indices n' and K'. The fluid was sheared at 100 sec$^{-1}$ between shear rate sweeps, and the shear rate sweep was repeated every 30 minutes. A base line was established before testing with Fluid A, Fluid B and Fluid C and the results are shown in FIG. 1.

Example 2

Two fracturing fluids D and E were prepared by adding 1.2 ml of an acetic acid buffer to 10 ml carboxymethylhydroxypropyl guar polymer slurry in 1000 ml tap water to bring the pH of the solution to 5.5. A scale inhibitor was added to each of the fluids. Fluid D contained 2 gpt of polyvinyl sulfonate and Fluid E contained 2 gpt of AMPS polymer. Then, 3 ml sodium thiosulfate gel stabilizer (commercially available as GS-1L from Baker Hughes Incorporated) and 1.25 ml XLW-60 crosslinker were added to the solution and a viscous gel instantly resulted requiring high shear to assure homogeneity. The viscosity was measured with a Fann 50 viscometer at 240° F. The fluid were initially sheared at 100 sec$^{-1}$, followed by a shear rate sweeps of 100, 80, 60 and 40 sec$^{-1}$ to calculate the power law indices n' and K'. The fluid was sheared at 100 sec' between shear rate sweeps, and the shear rate sweep was repeated every 30 minutes. A base line was established before testing and the results are shown in FIG. 2.

Example 3

Three fracturing fluids—F, G and H—were prepared by adding 2.5 ml of a buffering agent, commercially available from Baker Hughes Incorporated as BF-55L, to 7.5 ml carboxymethyl cellulose slurry in 1000 ml tap water to bring the pH of the solution to 5.4. A scale inhibitor was added to each of the fluids. Fluid F contained 2 gallons per thousand (gpt) of polyvinyl sulfonate, Fluid G contained 4 gpt of polyvinyl sulfonate and Fluid H contained 2 gpt of AMPS polymer. Then 3 ml of a zirconium crosslinker, commercially available as XLW-22C from Baker Hughes Incorporated, was added to each of the fluids. Viscous gels instantly resulted requiring high shear to assure homogeneity. The viscosity was measured with a Fann 50 viscometer at 200° F. The fluids were initially sheared at 100 sec$^{-1}$, followed by a shear rate sweeps of 100, 80, 60 and 40 sec$^{-1}$ to calculate the power law indices n' and K'. The fluid was sheared at 100 sec' between shear rate sweeps, and the shear rate sweep was repeated every 30 minutes. A base line was established before testing with Fluid F, Fluid G and Fluid H. The results are shown in FIG. 3.

Figure 2:
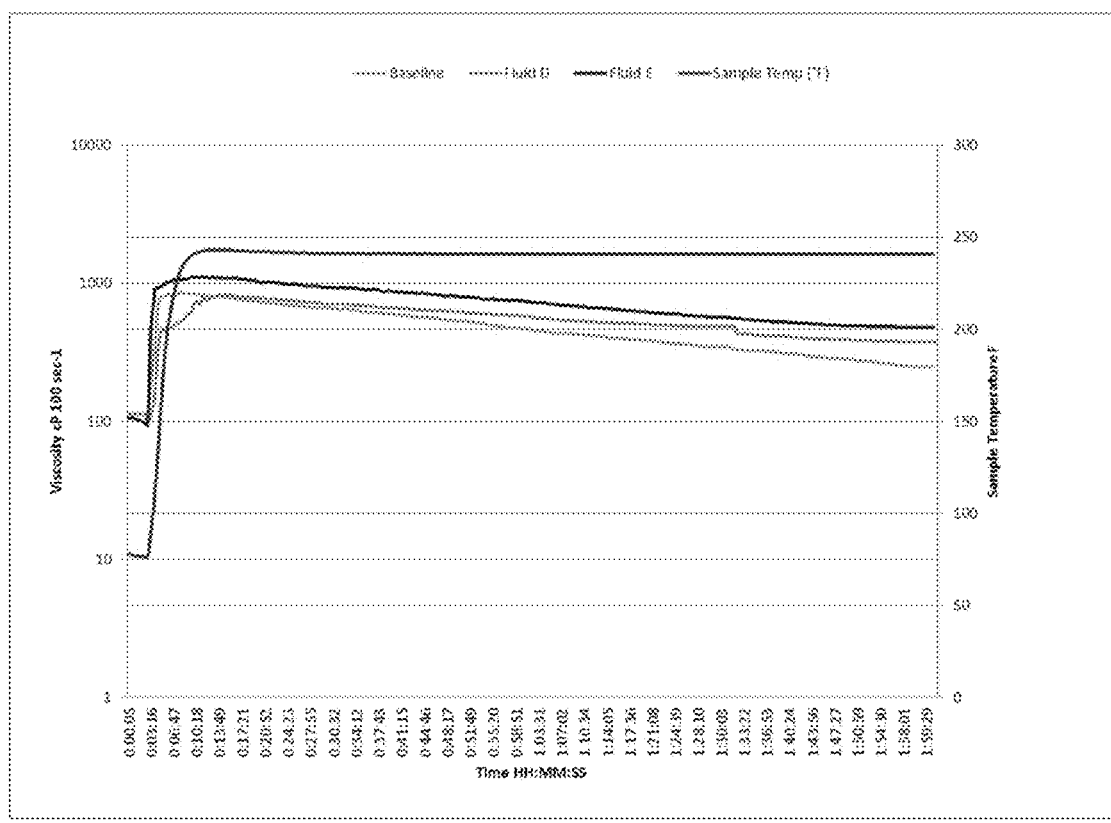
FIG. 2 compares fluid rheology between two separate fluids having low pH and containing carboxymethylhydroxypropyl guar and a zirconium crosslinker and a polyvinyl sulfonate and polyacrylamidomethylpropane sulfonic acid as scale inhibitor.
Figure 3:
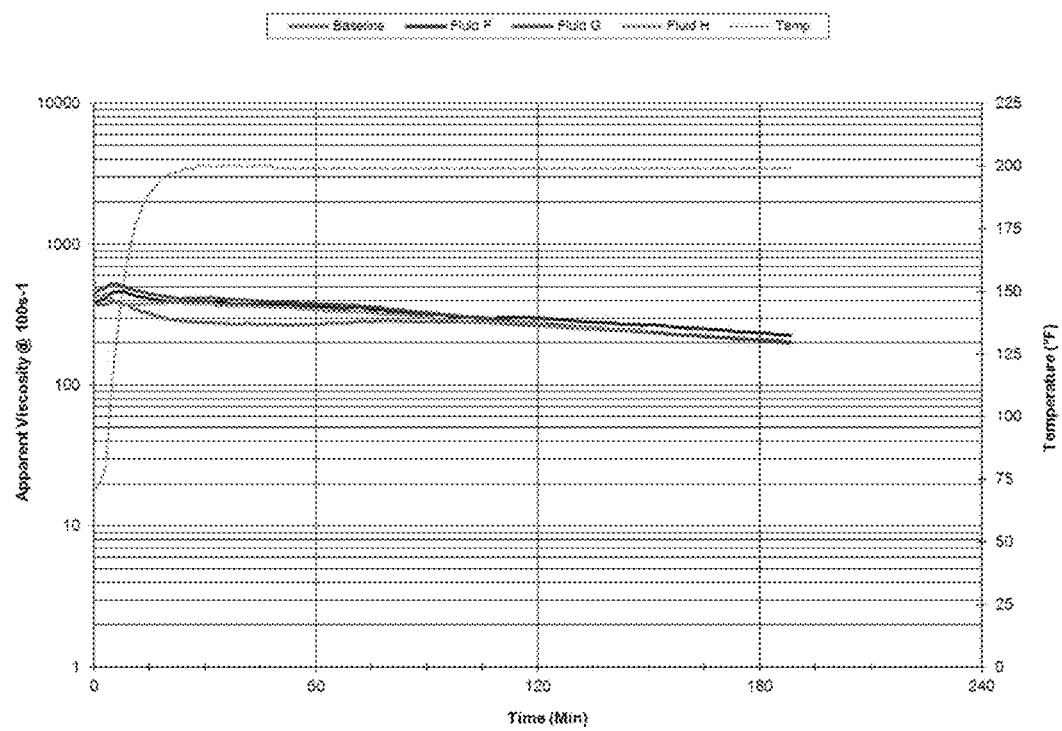
FIG. 3 compares fluid rheology between fluids having low pH and containing carboxymethyl cellulose, a zirconium crosslinker and a polyvinyl sulfonate and polyacrylamidomethylpropane sulfonic acid as scale inhibitor.

FIGS. 1, 2 and 3 show that viscosity of the gel is maintained over a period of time at temperatures in excess of 240° F.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of subjecting a hydrocarbon-bearing calcareous or siliceous formation penetrated by a well to a hydraulic fracturing operation which comprises:
   (a) pumping into the well at a pressure sufficient to create or enlarge fractures in the hydrocarbon-bearing calcareous or siliceous formation an aqueous fracturing fluid comprising:
      (i) a crosslinkable viscosifying polymer;
      (ii) an organometallic crosslinking agent containing a polyvalent metal ion;
      (iii) a scale inhibitor selected from the group consisting of polyvinyl sulfonates, a polyacrylamidomethylpropane sulfonic acid, carboxymethyl inulin and sulfonated polyacrylates and mixtures thereof; and
      (iv) a proppant
   and creating or enlarging fractures within the hydrocarbon-bearing calcareous or siliceous formation;
   (b) forming a viscous gel containing the scale inhibitor after step (a) by forming crosslinks between the crosslinkable viscosifying polymer and organometallic crosslinking agent wherein the crosslinkable viscosifying polymer forming the crosslinks with the organometallic crosslinking agent consists essentially of a cellulosic derivative, galactomannan gum, carrageenan, polyacrylamide, alkylpolyacrylamide, partially hydrolyzed polyacrylamide or a copolymer of acrylamide and either an acrylate or acrylamidomethylpropane sulfonic acid or a mixture thereof and further wherein the viscous gel is stable at a temperature in excess of 150° F. and exhibits a viscosity in excess of 500 cP at 100 sec$^{-1}$ at 150° F.;
   (c) transporting the scale inhibitor in the viscous gel into the formation;
   (d) preventing and/or inhibiting the formation of scales in the well and/or formation with the transported scale inhibitor; and
   (e) exposing the proppant to formation closure stresses.

2. The method of claim 1, wherein the polyvalent metal ion is selected from the group consisting of Zr, Ti, Al and Sb and mixtures thereof.

3. The method of claim 1, wherein the scale inhibitor is a polyvinyl sulfonate having a number average molecular weight from about 500 to about 100,000.

4. The method of claim 1, wherein the scale inhibitor is polyacrylamidomethylpropane sulfonic acid having a number average molecular weight from about 500 to about 200,000.

5. The method of claim 1, wherein the scale inhibitor is carboxymethyl inulin having a number average molecular weight from about 500 to about 30,000.

6. The method of claim 1, wherein the scale inhibitor is a sulfonated polyacrylate copolymer having a number average molecular weight between from about 500 to about 30,000.

7. The method of claim 1, wherein the polyvalent metal of the organometallic crosslinking agent is titanium.

8. The method of claim 1, wherein the polyvalent metal of the organometallic crosslinking agent is zirconium.

9. The method of claim 1, wherein the scale inhibitor is a polyacrylamidomethylpropane sulfonic acid and further wherein the pH of the fracturing fluid is between from about 3.0 to about 6.0.

10. The method of claim 1, wherein the scale inhibitor is a polyvinyl sulfonate and further wherein the pH of the fracturing fluid is between from about 3 to about 6.

11. The method of claim 1, wherein the scale inhibitor is a carboxymethyl inulin and further wherein the pH of the fracturing fluid is between from about 8 to about 12.

12. The method of claim 1, wherein the scale inhibitor is a sulfonated polyacrylate and further wherein the pH of the fracturing fluid is between from about 8 to about 12.

13. The method of claim 1, further comprising preventing and/or inhibiting the formation of scales on tubing, casing, pipes, pumps or valves located within the well.

14. The method of claim 1, wherein the crosslinkable viscosifying polymer forming the crosslinks with the organometallic crosslinking agent contains one or more functional groups selected from the group consisting of hydroxyl, carboxyl, sulfate, sulfonate, amino and amido and mixtures thereof.

15. The method of claim 1, wherein the crosslinkable viscosifying polymer forming the crosslinks with the organometallic crosslinking agent consists essentially of a galactomannan gum, polyacrylamide, alkylpolyacrylamide, partially hydrolyzed polyacrylamide or a copolymer of acrylamide and either an acrylate or acrylamidomethylpropane sulfonic acid or a mixture thereof.

16. The method of claim 15, wherein the crosslinkable viscosifying polymer forming the crosslinks with the organometallic crosslinking agent consists essentially of a hydroxyalkyl cellulose, alkylhydroxyalkyl cellulose carboxyalkyl cellulose underivatized guar, derivatized guar or a mixture thereof.

17. The method of claim 16, wherein the crosslinkable viscosifying polymer forming the crosslinks with the organometallic crosslinking agent consists essentially underivatized guar, a derivatized guar or a mixture thereof.

18. The method of claim 17, wherein the crosslinkable viscosifying polymer forming the crosslinks with the organometallic crosslinking agent consists essentially of a derivatized guar selected from the group consisting of hydroxypropyl guar, hydroxyethyl guar, hydroxybutyl guar and carboxymethylhydroxypropyl guar and mixtures thereof.

19. The method of claim 1, wherein the stable gel has a viscosity from about 800 to 900 cP at 100 $sec^{-1}$ at a temperature in excess of 250° F.

20. A method of inhibiting or controlling the deposition of scales in a well or in a subterranean formation penetrated by a well during a fracturing operation, the method comprising:
 (a) pumping into the well at a pressure sufficient to create or enlarge a fracture a fracturing fluid, wherein the fracturing fluid comprises:
  (i) a hydratable viscosifying polymer;
  (ii) an organometallic crosslinking agent containing a metal selected from the group consisting of Zr, Ti, Al and Sb and mixtures thereof;
  (iii) a scale inhibitor selected from the group consisting of polyvinyl sulfonates having a number average molecular weight from about 500 to about 100,000, a polyacrylamidomethylpropane sulfonic acid having a number average molecular weight from about 500 to about 200,000, a carboxymethyl inulin having a number average molecular weight from about 500 to about 30,000 and sulfonated polyacrylates having a number average molecular weight from about 500 to about 30,000 and mixtures thereof; and
  (iv) a proppant
 (b) forming a viscous gel from the fracturing fluid containing the scale inhibitor by forming crosslinks between the viscosifying polymer and the organometallic crosslinking agent in the presence of the scale inhibitor wherein the viscous gel is stable at a temperature in excess of 150° F. during the fracturing operation and has a viscosity in excess of 500 cP at 100 $sec^{-1}$ at a temperature in excess of 150° F. and wherein the viscosifying polymer forming the crosslinks consists essentially of underivatized guar or a guar derivative or a mixture thereof; and
 (c) transporting the scale inhibitor into a targeted zone of the subterranean formation subjected to the fracturing operation.

21. The method of claim 20, wherein the viscous gel is stable at a temperature in excess of 250° F. during the fracturing operation and has a viscosity from about 800 to 900 cP at 100 $sec^{-1}$ at a temperature in excess of 250° F.

* * * * *